United States Patent [19]
Sollich

[11] Patent Number: 5,437,723
[45] Date of Patent: Aug. 1, 1995

[54] COATING MACHINE FOR THE PROCESSING OF CHOCOLATE AND SIMILAR MASSES

[75] Inventor: Helmut Sollich, Rabenkirchen, Germany

[73] Assignee: Sollich GmbH & Co. KG, Salzuflen, Germany

[21] Appl. No.: 155,451

[22] Filed: Nov. 19, 1993

[30] Foreign Application Priority Data

Dec. 23, 1992 [DE] Germany .................. 42 43 814.4

[51] Int. Cl.6 .............................................. A23G 1/04
[52] U.S. Cl. ...................................... 118/21; 118/17; 118/22; 118/30; 118/31; 118/57; 118/63; 118/70
[58] Field of Search ................. 118/17, 21, 22, 24, 118/30, 31, 57, 63, 70; 426/306; 198/813, 812, 588

[56] References Cited

U.S. PATENT DOCUMENTS

| | | | |
|---|---|---|---|
| 3,759,218 | 9/1973 | Korstvedt | 118/21 |
| 3,958,018 | 5/1976 | Tay | 426/306 |
| 4,193,373 | 3/1980 | Hanson, Jr. et al. | 118/17 |
| 4,821,870 | 4/1989 | Simelunas et al. | 198/812 |
| 4,979,463 | 12/1990 | Sollich | 118/21 |
| 5,205,400 | 4/1993 | Breuss et al. | 198/812 |
| 5,322,154 | 6/1994 | Lenherr | 198/812 |

FOREIGN PATENT DOCUMENTS 3336259 4/1985 Germany .
4209966 3/1993 Germany .

Primary Examiner—W. Gary Jones
Assistant Examiner—Laura E. Edwards
Attorney, Agent, or Firm—Hopkins & Thomas

[57] ABSTRACT

A coating machine for the processing of chocolate and similar masses having a frame and a circularly driven grating belt supported thereon for the reception of the articles to be coated. The grating belt is guided by deflectors and has a tensioning device. Coating machine components are arranged below the upper run of the grating belt. The tensioning device has an extended travel enabling the lifting of the grating belt. A plurality of supports are provided to support the lifted grating belt, the supports including carriers on the frame of the coating machine.

16 Claims, 1 Drawing Sheet

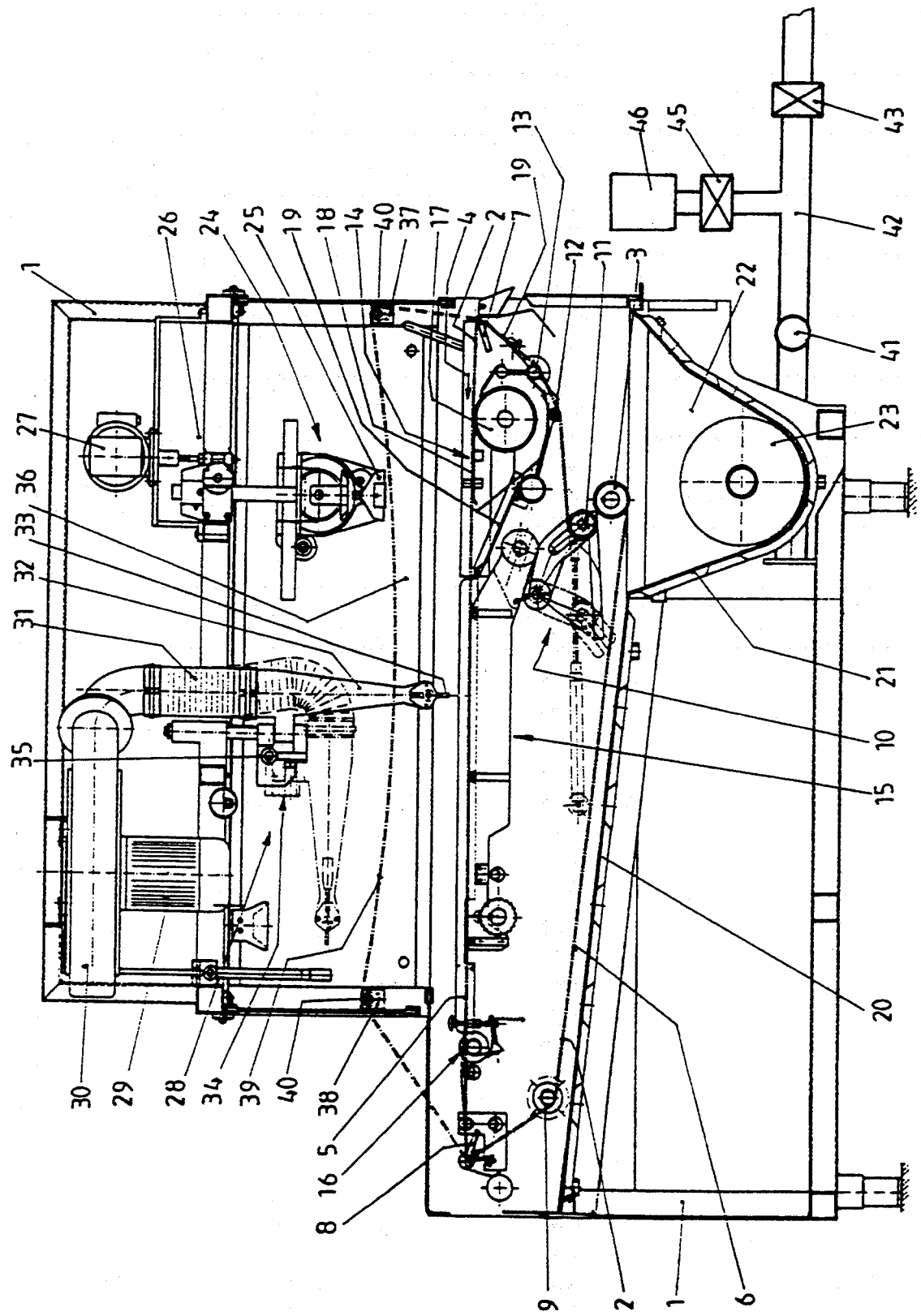

COATING MACHINE FOR THE PROCESSING OF CHOCOLATE AND SIMILAR MASSES

BACKGROUND OF THE INVENTION

The invention relates to a coating machine for the processing of chocolate and similar masses, having a frame and bearing therein a circularly driven grating belt for the reception of the articles to be coated, which is guided by deflectors and has a tensioning device, and with pieces of the coating machine, especially a shaking device, arranged under the upper run of the grating belt. Such a coating machine serves to cover the articles on the grating belt with chocolate, the chocolate flowing in surplus through the coating machine penetrating the grating belt and coming into contact with many parts of the coating machine. It may be a coating machine which has a covering station in which the liquid chocolate reaches the articles in free fall. The coating machine may also have a bottom covering station and-/or a blower to blow off any surplus chocolate. Masses other than chocolate, such as fat-containing masses, coating masses and, caramel masses may also be processed with such a coating machine.

When changing the mass in the coating machine, that is when a dark chocolate has been processed and the following articles are to be coated with a light chocolate or even a white coating mass, the problem to remove the previously processed mass and to clean all parts which have been in contact with this mass, so that the new mass, for example a white coating mass, can be used in the coating machine, arises.

It is known that in order to complete such a change of masses the coating machine including the previously processed mass is heated and emptied by removing the previously processed mass using a recovery pump. Then a cleaning mass such as cocoa butter or some other fatty solution is introduced into the coating machine. The coating machine is then put into action without any articles passing through, so that the cleaning mass is continuously recirculated and passes through the machine station. By this the cleaning mass reaches a large fraction of the parts of the coating machine contaminated with the old mass and cleans these more or less completely by melting off the old mass. But not all parts of the coating machine are reached by the cleaning mass, so that the cleaning action is incomplete. The cleaning mass is removed from the coating machine at the end of the cleaning and used in the normal production of chocolate. Afterwards the coating machine can be filled with the new coating mass.

It is further known to fashion major parts of the coating machine from stainless steel and to follow the emptying of the coating machine of the old mass with a wet-cleaning using pressurized hot water. This wet-cleaning is problematic in several aspects. When applying the stream of hot water onto the grating belt a considerable spraying and distribution action takes place, so that the pieces of the coating machine below the upper run are reached only incompletely. The hot water necessarily introduced into the coating machine during this cleaning procedure causes a contamination which creates favorable conditions for bacteria. To counteract this danger, it is known to conclude the wetcleaning by a blow-drying procedure with hot air. By this, too, the parts of the machine are heated, and the drying process is carried out for a correspondingly long time. But even so, not all parts of the machine are reached by the drying procedure, and there is no possibility to check whether all parts that had come into contact with the water have been dried.

In German patent application P 42 09 966.8 a tempering and coating machine for different masses, especially white and non-white chocolate, is described, in which a production line for articles has two coating machines assigned to it which can alternately be introduced into the production line, where one coating machine is determined to be used for dark coating masses and the other coating machine for light coating masses, and are provided thus, so that in this way a changing of the masses is avoided and the problem of changing the masses has been solved by using two seperate coating machines. This solution is possible only when there is enough room for the coating machines to the left and to the right of the production line, though. in many cases this room is not available, though, especially when several parallel production lines for articles are installed.

For the changing of masses in a coating machine it is also known to cut open the grating belt transversely to its direction of travel and thus to open the loop of the grating belt, so that the aggregates located below the upper run of the grating belt are well accessible for cleaning. Cleaning masses, which may consist of cocoa butter or, again, of hot water, have to be used for this cleaning. In this case, too, the cleaning is correspondingly cumbersome, elaborate, and unsure. Especially since the severed grating belt has to be reassembled.

SUMMARY OF THE INVENTION

The invention has the object to provide a coating machine of the above described type, in which the cleaning of the machine parts with a cleaning mass when changing the coating mass is possible with greater certainty and the pieces of the coating machine below the upper run of the coating machine are more accessible.

According to the invention this is achieved in the coating machine of the above described type in that the tensioning device has an extended tensioning travel enabling a lifting of the grating belt and that an apparatus is provided to support the lifted grating belt, to include supports for carriers on the frame of the coating machine.

The invention is based on the idea to fashion the grating belt in a liftable form and to support it with supports and carriers in the lifted state, so that the pieces of the machine below the upper run of the grating belt, for example a shaking device, a bottom-surge-station, a bottom-wipe-off roller and so on, are immediately accessible for cleaning with a cleaning mass, and cleaning therefore becomes easier, faster and more certain. The tensioning devices known also have a relatively small tensioning travel, as it is necessary when tensioning the grating belt to compensate for temperature influences. This tensioning travel is not enough to enable a lifting of the upper run of the grating belt in the relaxed state of the tensioning device. The tensioning travel has to be increased so that it becomes possible to lift up the closed loop of the grating belt in order to gain access from the side to the machine below the lifted grating belt. In order to secure the lifted state of the grating belt bearings are provided on the frame of the coating machine. To lift the grating belt, carriers, e.g. shafts, are inserted under the upper run of the grating belt after relaxing the tensioning device and the upper run is lifted with these. Preferably this is done at two well seperated places, at the beginning and the end of the coating machine for example. In the lifted state a distance of 20–30 cm is created between the raised run of the grating belt and the surface of the machine on which the grating belt travels, so that the cleaning mass may be directed onto the aggregates to be cleaned with a lance or nozzle in a direct way and without spraying through the grating belt. There is also the advantage of providing these pieces of the machine in a form that can easily be grasped and cleaned, e.g. also on the bottom sides, which up to now, when the grating belt is in its operating position, were not accessible. On the other hand the opening and laborious closing of the grating belt after the cleaning has become unnecessary. The cleaning should be performed with a cleaning mass, especially cocoa butter, and not with water, so that there is no danger of contamination.

Above the upper run of the grating belt a covering station and/or a blower may be arranged in a way that allows lifting, so that a space for the lifting and supporting of the grating belt is created. The covering station can consist of a curtain station, from which the liquid chocolate falls onto the articles on the grating belt and the articles are coated thus. Usually such a coating machine has a blower arranged after the covering station with which air is blown through a lip-like nozzle onto the articles treated under the covering station in order to remove excess chocolate from the articles and to return this excess through the grating belt to the recirculation cycle. It is also already known to fashion the covering station and/or the blower in a raisable way, including the help of motors or similar means, but this raisability is limited to adjustments with respect to the different heights of different articles to be coated on the grating belt. To create the space needed to raise and support the grating belt, so that the aggregates to be cleaned are readily accessible, the covering station and/or the blower must be arranged in a way that allows a comparatively much greater lift.

The blower can be arranged pivotably about a horizontal axis transverse to the direction of travel of the grating belt, so that, when the blower has been turned about said horizontal axis, the space for lifting and supporting of the grating belt is created. In principle such pivotable blowers are known. The pivotability has the object to exclusively change or adjust the angle at which air is blown onto the articles. With the new method of pivoting the blower, however, to create room for the raised grating belt, the blower or parts thereof are turned through an angle of about 90°, so that after the pivoting the necessary space for the grating belt is created.

It is also possible that one or both of the deflectors mounted at the ends is detachable in conjunction with or instead of an extended tensioning travel of the tensioning device. These one or two end-mounted deflectors often are comprised of a deflecting roller or a knife-edge rail, at which the grating belt is usually deflected at an acute angle. When this deflector or these deflectors can be removed, enough free length of the grating belt is created to lift the looped grating belt in the necessary amount and to support it at sufficient height on the supports of the frame of the coating machine so that the cleaning of the machines can be performed without problems. Primarily that deflector which is not driven will be formed to be detachable so that the detachability does not cause a lot of trouble. Usually one detachable deflector is sufficient, which should preferably be arranged at the intake end of the coating machine, in conjunction with the enlarged tensioning travel of the tensioning device, to achieve the intended lifting level of the grating belt.

It is also possible to provide one or both of the end-mounted deflectors on the frame of the coating machine to be pivotable. By this the required movability of the closed loop of the grating belt for lifting and supporting is also achieved. It is advantageous if one or both of the end-mounted deflectors also serves as the support for the lifted grating belt, so that the deflector rollers function as carriers at the same time.

It is further possible that one or both of the end-mounted deflectors are insertable into the supports on the frame of the coating machine and thus function as carriers for the lifted grating belt. By this the creation and use of special carriers for the grating belt is avoided. The rollers or rails which constitute the deflectors can simultaneously be used as carriers. The supports on the frame of the coating machine are then adapted correspondingly so that the distance is bridged by the imposed deflectors.

Essential parts of the coating machine positioned below the upper run of the grating belt which are accessible when the grating belt is raised, especially the plates of a dipping station of a bottom-covering station, can be arranged so that they are removable for cleaning purposes. This shows that the invention has the advantage of making it possible to form at least parts of the machine, which during the normal application of the coating machine are below the upper run of the grating belt, differently than has been realized in the state of the art. The trays of a dipping station of a bottom covering station, for instance, can be supported loosely, so that they are easily removed and cleaned on their back sides when the grating belt is raised. It is not necessary anymore to secure these trays with screws or even by welding. The same also holds for guide rails, parts of the tensioning device, bottom-wipe-off rollers, and/or parts of the usual shaking device.

The mixing chamber that is usually arranged beneath the lower run of the grating belt can have a connecting piece on its outlet side to be connected to a cleaning device working with a cleaning mass. This makes it possible to collect the cleaning mass in the mixing chamber during the cleaning and to withdraw it from the mixing chamber using the cleaning device or to recirculate the cleaning mass in this manner. When the connecting piece is arranged behind the return pump and provided with a valve, the return pump, which is normally used to transport the coating mass back to the tempering device, can advantageously be used to recirculate the cleaning mass through the cleaning device.

BRIEF DESCRIPTION OF THE DRAWINGS

The single FIGURE shows the parts of a coating machine relevant to the invention in a side view.

DETAILED DESCRIPTION

The coating machine has a frame 1, which is basically symmetric with respect to a logitudinal center plane of the coating machine. In the lower area the coating machine there is a grating belt 2 arranged in the form of a closed loop, which is driven by a drive roller 3 in the direction of the arrow 4. The grating belt 2 is shown in a bold dot-dashed line in its normal arrangement. It has an upper run 5 and a lower run 6. The upper run 5 extends from a deflector 7, which can be fashioned to be a rail or a roller, on the intake side to a deflector 8, which can also be fashioned to be a rail or a roller, on the outlet side. In the lower run 6 the grating belt 2 is lead via another deflector 9 to the drive roller 3. Following this is a tensioning device 10 with a tensioning roller 11. Further deflecting rollers 12 and 13 comlete the guidance of the lower run 6 until it reaches the deflector 7. The tensioning device 10 is shown in its normal tensioning position in a dashed line, while the solid line depicts the relaxed position. The length of the grating belt around the extreme positions of the tensioning roller 11 corresponds to twice the tensioning travel of the tensioning device 10.

During the normal operation of the coating machine the upper run 5 of the grating belt 2 will be approximately in the plane defined by the deflectors 7 and 8. Underneath the upper run 5 of the grating belt 2 different machine components are arranged. To clarify this a bottom covering station 14, a shaking device 15, a bottom-wipe-off station 16, as well as other not specified components are shown in an exemplary fashion. These components lie directly beneath the upper run 5 of the grating belt 2, and when the coating station is working properly, they come more or less into contact with the liquid coating mass, which then sticks to these parts, so that they have to be cleaned when the coating mass is changed. The bottom coating station 14 has a dipping roller 17, a bottom-surge-plate 18, as well as various plates 19 in the lower region, which also come into contact with the chocolate. The bottom of the grating belt 2 is surrounded by a tub 20, which in a hollow portion 21 extending downwards has a mixing chamber 22 with a mixing screw 23, in which the liquid chocolate is collected and recirculated in the known way by a circulating pump not shown.

In the upper region of the coating machine on the frame 1 a covering or coating station 24 is provided, whose essential component includes a curtain station 25, from which the chocolate pumped from the mixing chamber 22 falls onto the articles on the upper run 5 of the grating belt 2. The covering station 24 has a height-changing device 26, which is driven by a motor 27, to move the covering station 24 in a vertical direction. The covering station 24 is shown in a fully raised position, so that the curtain station 25 is separated by a large distance from the upper run 5 of the grating belt 2, which position is employed for cleaning only. Of course, when working with the coating machine, the curtain station 25 and the covering station 24 are in a much lower position, adjusted to the height and kind of articles to be coated on the grating belt 2.

In the direction of travel of the articles on the grating belt 2 a blower 28, which has a motor 29 for a turbine 30 to draw in and accelerate air, is arranged behind the coating station 24. The air is ducted through a hose 31 into a blower pipe 32 and streams through a nozzle-like lip 33 onto the articles just previously coated with liquid chocolate, so that the excess chocolate is blown off, passes through the upper run 5 of the grating belt 2 and flows through the tub 20 back into the mixing chamber 22. The blower 28 has a height-changing device 34 and the blower pipe 32 is arranged so that it is pivotable about a horizontal axis 35. The working position is depicted by the solid line. Swung by about 90° is the cleaning position, shown in dot-dashed line. By raising and/or swinging away the covering station 24 and/or the blower 28 a space 36 above the upper run 5 of the grating belt 2 is created, into which the grating belt 2 is lifted, when the components 14, 15, 16, 10 and so on are to be cleaned when changing the coating mass. The tensioning device 10 has to be relaxed beforehand, of course, so that at least the upper run 5 of the grating belt 2 is readily movable for lifting. In a corresponding height above the components 14, 15, and 16 supports 37, 38 are provided on the frame 1, which are arranged on both sides relative to the grating belt 2 on the frame 1. To facilitate the lifting and securing of the grating belt to the position shown by line 39, carriers 40 are inserted underneath the upper run 5 of the grating belt 2, after the tensioning device 10 has been relaxed. It is then, after raising the covering station 24 and/or swinging away the blower 28, possible to lift the carriers 40 and with these the grating belt 2, and to rest the carriers 40 in the supports 37 and 38. It is then, easy to approach components 14, 15, 16, 10, 3, 19, 20, so that cleaning is much more certain with the cleaning mass and can be done without the spraying effect through the grating belt 2. After the cleaning the cleaning mass is removed and the new coating mass can be put into the coating machine. The grating belt 2 is then lowered again, of course, and the tensioning device 10 supplies the necessary tension. The covering station 24 and the blower 28 are lowered into their normal operating positions, too.

A return pump 41 is connected to the mixing chamber 22 in the known way. In a pipe line 42 a valve 43 is provded, through which in its opened position the chocolate mass is normaly returned to a tempering device. The return pump 41 can also be used to empty the coating machine. The pipe line 42 is provided with a connecting piece 44 and a valve 45, to which a cleaning device 46 can be connected for cleaning with a cleaning mass when the valve 43 is closed, so that using the return pump 41 the cleaning mass can be recirculated. The cleaning mass is directed onto the machine components to be cleaned using a lance-like device, of course, and subsequently is returned to the mixing chamber 22.

One or both of the deflectors 7, 8 can be made to be removable and/or pivotable to replace or simplify at least partially the function of relaxing the tensioning device 10, so that the grating belt 2 is more readily movable for lifting. It is also possible, though, that the deflectors 7 and 8 are provided in a pivotable way on the frame 1, so that they can also take on the function of the carriers 40. Then it is either possible to do without the supports 37 and 38, because this function will be fulfilled also by the swung-up deflectors 7 and 8, or it is possible to put the rail- or roller-like deflectors 7 and 8 directly onto the supports 37 and 38, and to thereby maintain the grating belt 2 in the raised position during cleaning.

While a preferred embodiment of the invention has been disclosed in the foregoing specification and in the drawing, it will be apparent to those skilled in the art that variations and modifications thereof can be made without departing from the spirit and scope of the invention, as set forth in the following claims.

LIST OF REFERENCE NUMERALS 1-frame
2-grating belt
3-drive roller
4-arrow
5-upper run
6-lower run 7-deflector
8-deflector
9-deflecting roller
10-tensioning device
11-tensioning roller
12-deflecting roller
13-deflecting roller
14-bottom-coating station
15-shaking device
16-bottom-wipe-off roller
17-dipping roller
18-bottom-surge-plate
19-plate
20-tub
21-hollow
22-mixing chamber
23-mixing screw
24-covering station
25-curtain station
26-height-changing device
27-motor
28-blower
29-motor
30-turbine
31-hose
32-blower pipe
33-lip
34-height-changing device
35-axis
36-space
37-support
38-support
39-line
40-carrier
41-return pump
42-pipe line
43-valve
44-connecting piece
45-valve
46-cleaning device

I claim:

1. A coating machine for the processing of chocolate and similar masses, comprising:
 a frame;
 a circularly driven grating belt, the grating belt having an upper run and a lower run;
 deflector means mounted on the frame for supporting the grating belt on the frame;
 a tensioning device supported on the frame and engaged with said grating belt, the tensioning device being moveable from a tensioning position into a relaxed position for creating slack in the grating belt;
 a shaking device supported on the frame below the upper run of the grating belt;
 a covering station supported on the frame above the upper run of the grating belt;
 support means disposed below said covering station for holding the upper run of the grating belt above the shaking device;
 a blower movably supported on the frame above the upper run of the grating belt between a first position for directing a stream of air toward, and a second position facing away from, the upper run of the grating belt to create a space above the upper run of the grating belt to allow for the lifting of the grating belt above the shaking device;
 whereby when the tensioning device is moved into its relaxed position, the blower is moved away from the grating belt, and the upper run of the grating belt is lifted away from the shaking device and supported on said support means above the shaking device so that the coating machine can be cleaned without interference from the grating belt and without having to remove the grating belt from the coating machine.

2. The coating machine of claim 1, wherein said deflector means is removably supported on said frame.

3. The coating machine of claim 1, wherein said deflector means is pivotably supported on said frame.

4. The coating machine of claim 1, wherein said deflector means comprises a plurality of deflecting rollers on which the grating belt is carried.

5. The coating machine of claim 1, wherein said deflector means is removed from said frame and held by said support means on the frame of the coating machine to act as carriers for the lifted grating belt.

6. The coating machine of claim 1, wherein said shaking device is sized and shaped to be removable from said frame for cleaning.

7. The coating machine of claim 1, wherein said support means comprises a plurality of supports mounted on the frame above the upper run of the grating belt and below the covering station.

8. A coating machine for the processing of chocolate and similar masses, comprising:
 a frame;
 a circularly driven grating belt, the grating belt having an upper run and a lower run;
 deflector means mounted on the frame for supporting the grating belt on the frame;
 a tensioning device supported on the frame and engaged with said grating belt, the tensioning device being moveable from a tensioning position into a relaxed position for creating slack in the grating belt;
 a shaking device supported on the frame below the upper run of the grating belt;
 a covering station supported on the frame above the upper run of the grating belt;
 support means disposed below said covering station for holding the upper run of the grating belt above the shaking device;
 a mixing chamber supported on the frame below the lower run of the grating belt, the mixing chamber including a connecting piece extending from the mixing chamber and connected to a cleaning device for cleaning the coating machine;
 whereby the tensioning device is moved into its relaxed position and the upper run of the grating belt is lifted away from the shaking device and supported on said support means above the shaking device so that the coating machine can be cleaned without interference from the grating belt and without having to remove the grating belt from the coating machine.

9. The coating machine of claim 8, wherein said connecting piece includes a return pump and a valve positioned between said mixing chamber and said cleaning device.

10. A coating machine for the processing of chocolate and similar masses, comprising:
 a frame;
 a circularly driven grating belt, the grating belt having an upper run and a lower run;

deflector means mounted on the frame for movably supporting said grating belt on said frame;

a shaking device supported on said frame between the upper run and the lower run of the grating belt;

tensioning device means supported on said frame and disposed on said grating belt, said tensioning device means being moveable from a tensioning position into a relaxed position and back for providing enough slack in the grating belt to allow the upper run of the grating belt to be lifted upward and away from the shaking device;

support means mounted on said frame for holding the grating belt above the shaking device; and a mixing chamber supported on the frame below the lower run of the grating belt, the mixing chamber including a connecting piece extending from the mixing chamber and said connecting piece being connected to a cleaning device for cleaning the coating machine;

whereby the tensioning device means is moved into its relaxed position and the upper run of the grating belt is lifted away from the shaking device and is supported on the support means above the shaking device when it is desired to clean the coating machine so that the coating machine, to include the shaking device, can be readily cleaned without interference from the grating belt and without having to remove the grating belt from the coating machine.

11. The coating machine of claim 10, wherein said deflector means comprises a plurality of deflecting rollers on which the grating belt is carried.

12. The coating machine of claim 11, wherein said covering station is sized and shaped to be movably mounted on said frame so that the covering station moves toward and away from the shaking device.

13. The coating machine of claim 10, wherein said support means comprises a plurality of supports mounted on the frame above the upper run of the grating belt and below the covering station.

14. The coating machine of claim 10, wherein said coating machine further comprises a blower movably supported on the frame above the upper run of the grating belt, the blower being supported on a horizontal axis transverse to the direction of travel of the grating belt, wherein the blower is pivotable about its horizontal axis to create a space above the upper run of the grating belt to allow for the lifting of the grating belt above the shaking device.

15. The coating machine of claim 10, wherein said coating machine further comprises a covering station supported on the frame above the upper run of the grating belt.

16. The coating machine of claim 10, wherein said connecting piece further comprises a return pump and at least one valve.

* * * * *